(12) United States Patent
Brawn

(10) Patent No.: US 7,677,347 B2
(45) Date of Patent: Mar. 16, 2010

(54) ADJUSTABLE SHOCK

(75) Inventor: J. D. Brawn, Costa Mesa, CA (US)

(73) Assignee: Sophie Braun, Costa Mesa, CA (US)

( * ) Notice: Subject to any disclaimer, the term of this patent is extended or adjusted under 35 U.S.C. 154(b) by 512 days.

(21) Appl. No.: 11/728,439

(22) Filed: Mar. 26, 2007

(65) Prior Publication Data

US 2008/0238073 A1 Oct. 2, 2008

(51) Int. Cl.
*B62K 11/00* (2006.01)

(52) U.S. Cl. ............................ 180/227; 280/284

(58) Field of Classification Search ................ 280/284; 180/227; 137/102, 106, 115.01, 115.07; 188/267.1
See application file for complete search history.

(56) References Cited

U.S. PATENT DOCUMENTS

| | | | | |
|---|---|---|---|---|
| 2,869,892 A * | 1/1959 | Sahagian | ................. | 280/5.5 |
| 3,467,127 A * | 9/1969 | Schneider | .............. | 137/115.07 |
| 3,628,556 A * | 12/1971 | Bachman | ................. | 137/86 |
| 5,011,205 A * | 4/1991 | Liu | ................. | 293/5 |
| 5,222,873 A * | 6/1993 | Whitehead et al. | .......... | 417/344 |
| 5,975,230 A * | 11/1999 | Bourget | ................. | 180/225 |
| 6,003,628 A * | 12/1999 | Jurrens et al. | ............... | 180/227 |
| 6,193,005 B1 * | 2/2001 | Jurrens | .................. | 180/227 |
| 6,352,143 B1 * | 3/2002 | Niaura et al. | ............ | 188/267.1 |
| 6,357,546 B1 * | 3/2002 | Crosby, Jr. | ................. | 180/227 |
| 6,598,893 B2 * | 7/2003 | Parigian | .................. | 280/284 |
| 6,871,867 B2 * | 3/2005 | Parigian | .................. | 280/284 |
| 7,086,658 B2 * | 8/2006 | Parigian | .................. | 280/284 |
| 7,559,396 B2 * | 7/2009 | Schwindt | .................. | 180/227 |
| 2008/0231033 A1 * | 9/2008 | Brawn | .................. | 280/781 |

* cited by examiner

*Primary Examiner*—Paul N Dickson
*Assistant Examiner*—Daniel Yeagley
(74) *Attorney, Agent, or Firm*—Clement Cheng

(57) ABSTRACT

A motorcycle shock system has a shock body formed at least partially of aluminum and an air compressor that provides pressurized air to the shock body when necessary. A piston held within the shock body defines a rear air chamber and a forward air chamber on the opposite side of the piston. Four electrically controlled air valves include a first air valve that when actuated opens a passage to allow air to flow into the forward chamber, a second air valve that when actuated opens a passage to allow air to flow out of the forward chamber to the atmosphere, a third air valve that when actuated opens a passage to allow air to flow out of the rear air chamber, and a fourth air valve that when actuated opens a passage to allow air to flow into the rear air chamber.

20 Claims, 6 Drawing Sheets

ADJUSTABLE SHOCK

FIELD OF THE INVENTION

This invention relates to an adjustable shock for a motorcycle.

DISCUSSION OF RELATED ART

Motorcycle suspensions are an integral part of handling, stability and overall comfort in a ride. Suspension systems comprise a front suspension system typically configured in a fork and rear suspension systems also typically configured in a fork. The motorcycle design has a rigid frame portion and a rear wheel frame portion that are totally mounted so that the rear wheel frame portion is in pivoting connection with the main rigid frame portion. Rear suspension systems have a pivot design where the wheel is mounted on a pivoting rear suspension. The pivoting rear suspension is typically controlled by shock and spring to control the ride. Shock and spring are typically connected between the rear wheel frame portion and the main rigid frame portion. A variety of springs and dampeners for rear suspensions have been made that go between the frame portions. The most typical configuration is a shock or spring connecting between the frame portions.

Most of the springs and dampeners for rear suspension systems have been static and not adjustable. Also, the rear suspension system of the current state-of-the-art in does not allow height adjustment and firmness adjustment independently of each other. Of the adjustable suspension systems, some of the designs are not robust. If the line fails to the shock, some suspensions will drop the bike and cause potential injury. Also, some line leaks may cause potential injury.

Therefore, what is needed is a safe yet robust rear suspension system that can control height and firmness independently of each other, yet does not have problems in case of leak or line failure.

SUMMARY OF THE INVENTION

A motorcycle shock system has a shock body formed at least partially of aluminum and an air compressor that provides pressurized air to the shock body when necessary. A piston held within the shock body defines a rear air chamber and a forward air chamber on the opposite side of the piston. Four electrically controlled air valves include a first air valve that when actuated opens a passage to allow air to flow into the forward chamber, a second air valve that when actuated opens a passage to allow air to flow out of the forward chamber to the atmosphere, a third air valve that when actuated opens a passage to allow air to flow out of the rear air chamber, and a fourth air valve that when actuated opens a passage to allow air to flow into the rear air chamber. A body connector is mounted to the shock body. A piston shaft is mounted to the piston and sliding with the piston and a piston shaft connector connects to the piston shaft, so that the body connector and the piston shaft connector are adapted to be connected to a motorcycle. The air valves are controlled by an electronic controller having logic and receiving input from user input controls. A second piston held within the shock body defines a second rear air chamber and a second forward air chamber opposite the second piston. A second piston shaft mounted to the second piston slides with the second piston. A second piston shaft connector connects to the second piston shaft. The body connector and the second piston shaft connector are adapted to be connected to a motorcycle. A one-way air valve holds air inside the shock body and receiving air into the shock body.

Optionally, logic in the controller is configured so that user input controls comprise at least a height increase input, a height decrease input, a stiffness increase input, and a stiffness decrease input. The height increase input activates the first and third air valve. The height decrease input activates the second and fourth air valve. The stiffness increase input activates the first and fourth air valve. The stiffness decrease input activates the second and third air valve. Logic in the controller, can also include user input controls of at least a front chamber increase input, a front chamber decrease input, a back chamber increase input, and a back chamber decrease input. The front chamber increase input activates the first air valve. The front chamber decrease input activates the second air valve. The back chamber increase input activates the fourth air valve. The back chamber decrease input activates the third air valve. User input controls comprise at least a height increase input, a height decrease input, a stiffness increase input, and a stiffness decrease input.

The present invention is a shock having a plurality of shock chambers. The chambers are preferably formed from a single block of metal, such as aluminum. To avoid material waste, the formation should preferably be cast and then machined to tight tolerance. The best mode is a pair of chambers, one on the left and one on the right. The left and right chambers are preferably formed to receive air that is held within the chambers. Airflow is controlled by the solenoids actuating the air valves. The air valves allow flow between chambers. Preferably, the air chambers are cylindrical and in parallel configuration. The air chambers have a pair of pistons that are mechanically connected and linked to the motorcycle. The body of the shock is mechanically connected and linked to the motorcycle also.

The body of the shock forms a pair of connectors that connect to the frame of the motorcycle. The shafts connected to the pistons also have a pair of connectors formed on the pistons and these connectors connect to the frame part of the motorcycle.

The air chambers preferably have the air valves and solenoids controlling the air valves in an in-line, linear configuration where the air valves are mounted within a channel formed between the pair of air chambers. The air chambers are preferably horizontal and in parallel movement to the motion of the rear frame relative to the frame of the motorcycle. The solenoids are electrically activated and connected to a wiring harness with controls on the motorcycle, typically within reach of the user.

A compressor also connected to the wiring harness controls airflow into the air chambers. The air chambers are preferably connected so that they have even air pressure distribution between them.

DETAILED DESCRIPTION OF THE PREFERRED EMBODIMENT

Figure 1:
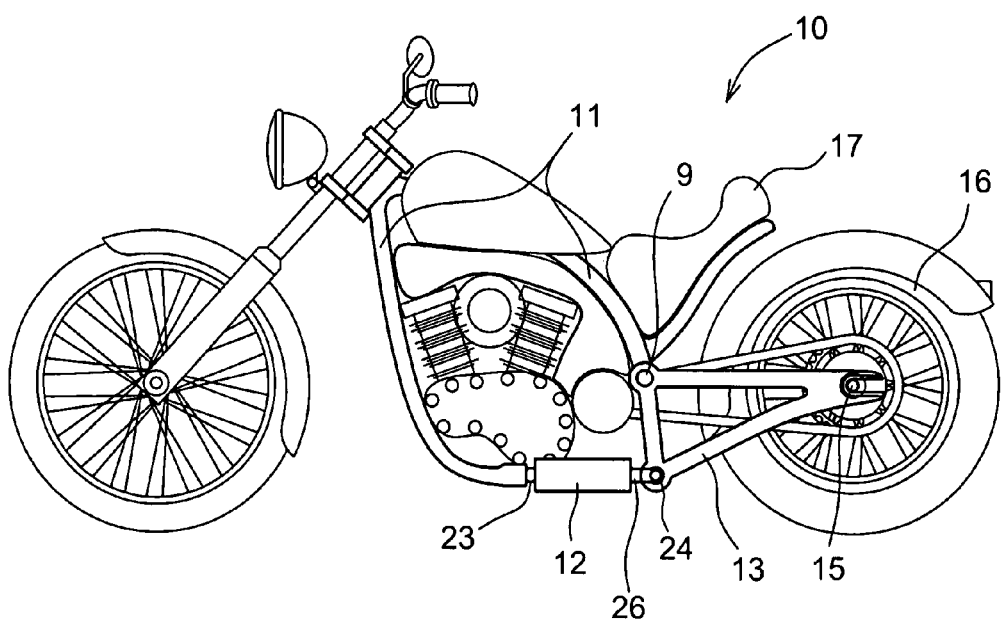
FIG. 1 is a side view diagram of the installation configuration of the invention.

FIG. 1 shows a motorcycle in a side view shown as a diagram to show the installation configuration of the invention. The device is a shock 12 having a body connector connected to the main rigid frame 11 of the motorcycle. The device also has a second connector mounted on the piston shaft 26 connecting to a piston shaft connector 24. The second connector is the piston shaft connector 24. The piston shaft connector 24 connects to the rear wheel frame having a pivoting axis of rotation 9 where the rear wheel frame 13 rotates about main rigid frame 11. Main rigid frame 11 further supports a seat 17. The rear wheel 16 is mounted on a rear wheel axle 15.

Although the shock 12 is connected with the piston shaft connector 24 connecting to the rear wheel frame 13, and the body connector 23 connected to the main rigid frame 11, the shock orientation can be reversed so that the piston shaft connector is connected to the main rigid frame 11 and the body connector 23 is connected to the rear wheel frame 13. The best mode however is to have the shock 12 connected with the piston shaft connector 24 connecting to the rear wheel frame and the body connector 23 connected to the main rigid frame 11. This allows less movement of the shock 12. When the wheel 16 contacts rough surface of the ground, the rear suspension 10 moves so that rear wheel frame 13 travels counterclockwise around axis of rotation 9.

Figure 2:
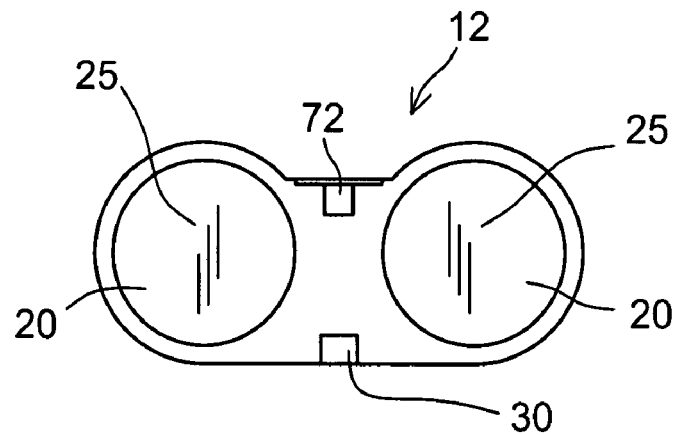
FIG. 2 is a cross sectional side view of the present invention.

FIG. 2 is a cross-section side view of the present invention showing a pair of pistons 25 mounted within the shock 12. The piston forms a front or forward air chamber 22 and a rear air chamber 20. Here, the rear air chamber 20 is an air chamber that is airtight. A one-way air valve 30 allows air to enter the shock 12, but does not allow it to leave. A groove 72 runs across the length of the shock body 12 providing channel where the solenoids can be mounted. Sufficient material is left below the channel so that the piston body has sufficient structural integrity against a variety of forces. The solenoids and air valves actuated by the solenoids are commercially available units typically having thread that can be threaded into the shock body 12 if threads are machined into the shock body 12. A variety of air channels are drilled through the body. Some air channels can be drilled from the left and right sides of the rear air chamber 20, and would require welding or other type of material patch or plug so that the air does not leak out through the side of the drilled area. Alternatively, drilling can be at a variety of angles such that welding or other type of material patch or plug is not necessary.

Figure 3:
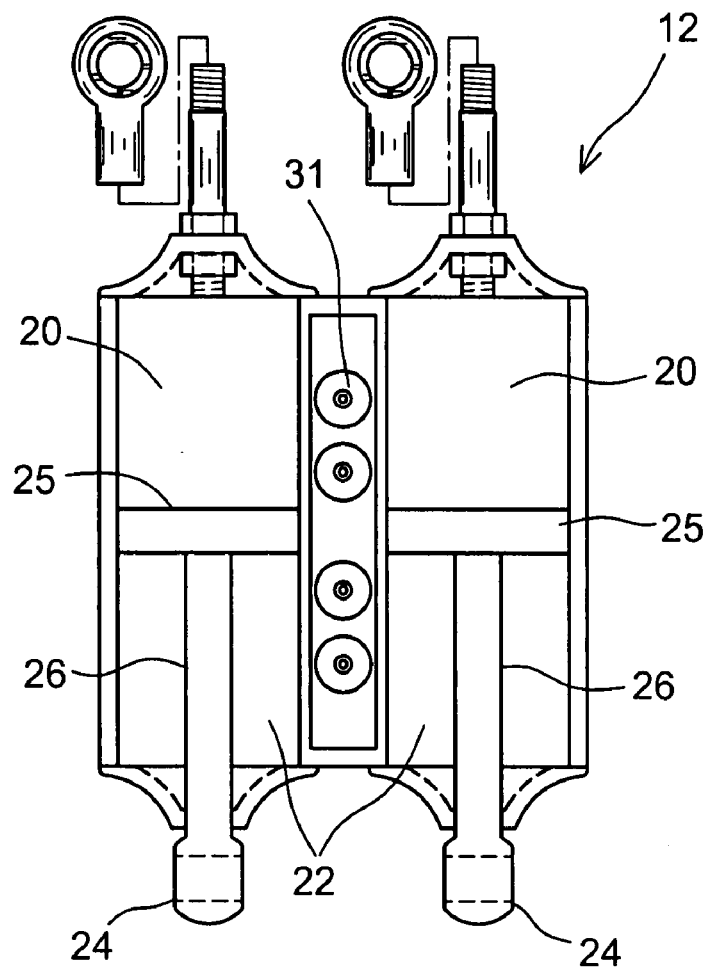
FIG. 3 is a cross-section top view of the present invention.

FIG. 3 is a cross-section top view of the device showing a pair of pistons 25 mounted on piston shafts 26 connecting to piston shaft connectors 24. A pair of forward air chambers 22 hold trapped air in airtight configuration between the pistons 25 and the shock body 12. On the other side, the rear air chambers 20 are also holding trapped air between the pistons 25 and the shock body 12. The trapped air can be moved in or out of the rear air chambers 20 or the front air chambers 22. A series of air valves 31 formed as solenoids actuating air seals are mounted between the pistons. The air valves 31 control air between the rear air chambers 20, front air chambers 22 and the external atmosphere. The air valves 31 have electrical contacts so that a controller 36 controls the actuation of the air valves. The air valves 31 are typically closed allowing uninterrupted operation. Because of the one way air valve 30 holding the air in the device 12, once the air pressure in the rear chambers 20 and the front chambers 22 are adjusted, the user does not need to fiddle with the device or make any further adjustments. The air valves if not actuated by electrical power are closed. Therefore, without electrical power, a user cannot make adjustments to the air pressure in either the rear chambers 20 or the front chambers 22. This failsafe mechanism allows for a safer ride. Typically, the user should stop to make adjustments in the air pressure.

FIG. 3 also shows that the solenoids controlling the air valves 31 are cylindrical and fit into air valve seats shown as four circles on FIG. 3. Thus, the air valves 31 have mechanical motion in a plane perpendicular to the motion of the pistons 25. The air valves 31 would typically actuate in a vertical direction while the pistons 25 what move in a horizontal position parallel to the motion of the motorcycle.

Figure 4:
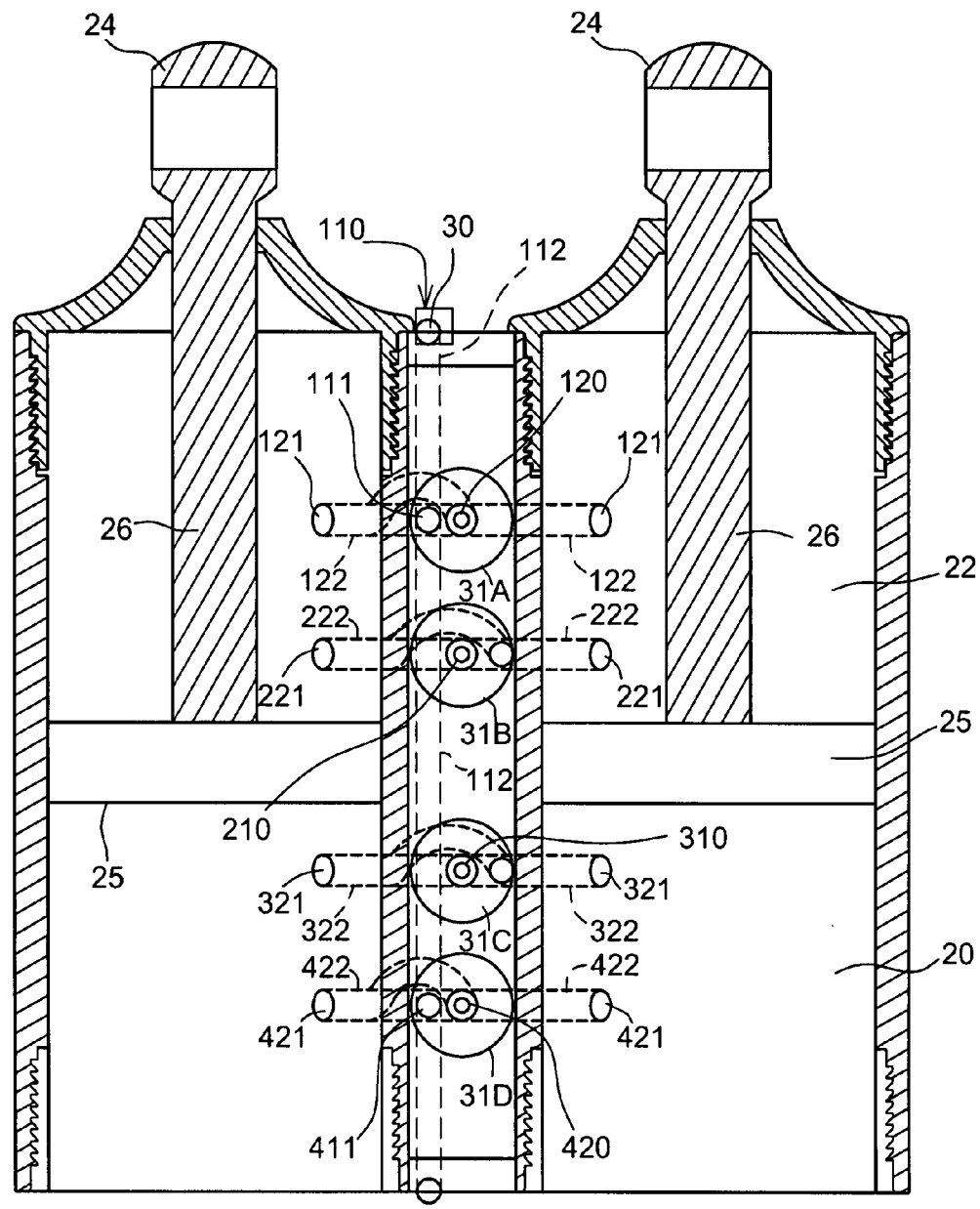
FIG. 4 is a diagram showing air passage and air control.

FIG. 4 is a diagram showing the air passage in the shock 12. The shock 12 has a body that is preferably made of aluminum. Although billet is popular, having a cast body provides substantial cost savings in material. Preferably, the shock 12 body is cast in aluminum having a pair of tubes forming chambers so that the pistons 25 travel back and forth inside the tubes defining the rear chambers 20 and forward chambers 22. A seal 510 between the piston shaft 26 and the body of the shock 12 provides airtight retention of pressure in front or forward chambers 22.

The flow of air begins from an air inlet 110 that is pressurized from a compressor 35 compressing air and pushing it through one-way valve 30. When the air is passed through the one-way valve 30, it does not leak out the same way but rather adds pressure and air to the main incoming line 112. The main incoming line supplies air pressure to port 111 on air valve 31A and simultaneously to port 411 on air valve 31D. If air valve 31A is actuated, port 111 is in fluid flow with port 120 if the solenoid lifts the air seal off of the seat. When port 111 connects to port 120, air pressure and air flows through air inlet passage 122 through port 121 into forward chamber 22. Similarly, port 411 receiving air from the main incoming line 112 is typically sealed at air valve 31D, but if the air valve 31D lifts, air at port 411 goes to port 420 then to air inlet passage 422 through port 421 into rear chambers 20.

Rear air chambers 20 are able to release air through port 321 passing air through out let passage 322 into port 320 so that when solenoid related to air valve 31C is actuated, air valve 31C allows fluid connection between port 310 and 320. Port 310 is preferably a drilled hole passing to the outside of the shock 12 device body. Similarly, front air chambers 22 can release air to the outside atmosphere via port 221 passing through out let passage 222 connecting to port 220 so that should air valve 31B be actuated, air flows from port 220 to port 210 which is also preferably a drilled hole passing to the outside of the shock 12 device body. Therefore, port 210 and 310 are exhaust ports while ports 120 and 420 are inlet ports.

The ports are formed as apertures within the aluminum body of the shock device. They are preferably drilled in a configuration so that straight drilling can provide an airway passage matrix having the function as shown in FIG. 4. The air passages 122, 222, 322, and 422 are shown as curved passages in FIG. 4, but can also be straight drilled passages. They are shown as curved passages and straight passages so that both options are shown. Generally, the curved passages are not preferable because as can be seen from FIG. 4, they appear to be difficult to craft.

The air passage for the bleeder 222 and the opening for the bleeder air passage 221 need not be formed if the bleeder air passage 222 is connected to the main air inlet passage 110. In the embodiment where the air passage for the bleeder 222 and the opening for the bleeder air passage 221 is missing, the inlet air passage 122 and the inlet air opening 121 operate as the bleeder air passage 222 when the bleeding air so that air goes out of the inlet air opening 121 and passes out of the exit port 210 when solenoid and valve 31B is activated in open position. Similarly, the air passage for the bleeder 322 and the opening for the bleeder air passage 321 need not be formed if the bleeder air passage 322 is connected to the main air inlet passage 110. In the embodiment where the air passage for the bleeder 322 and the opening for the bleeder air passage 321 is missing, the inlet air passage 122 and the inlet air opening 121 operate as the bleeder air passage 322 when the bleeding air so that air goes out of the inlet air opening 121 and passes out of the exit port 310 when solenoid and valve 31C is activated in open position.

Figures 5, 6:
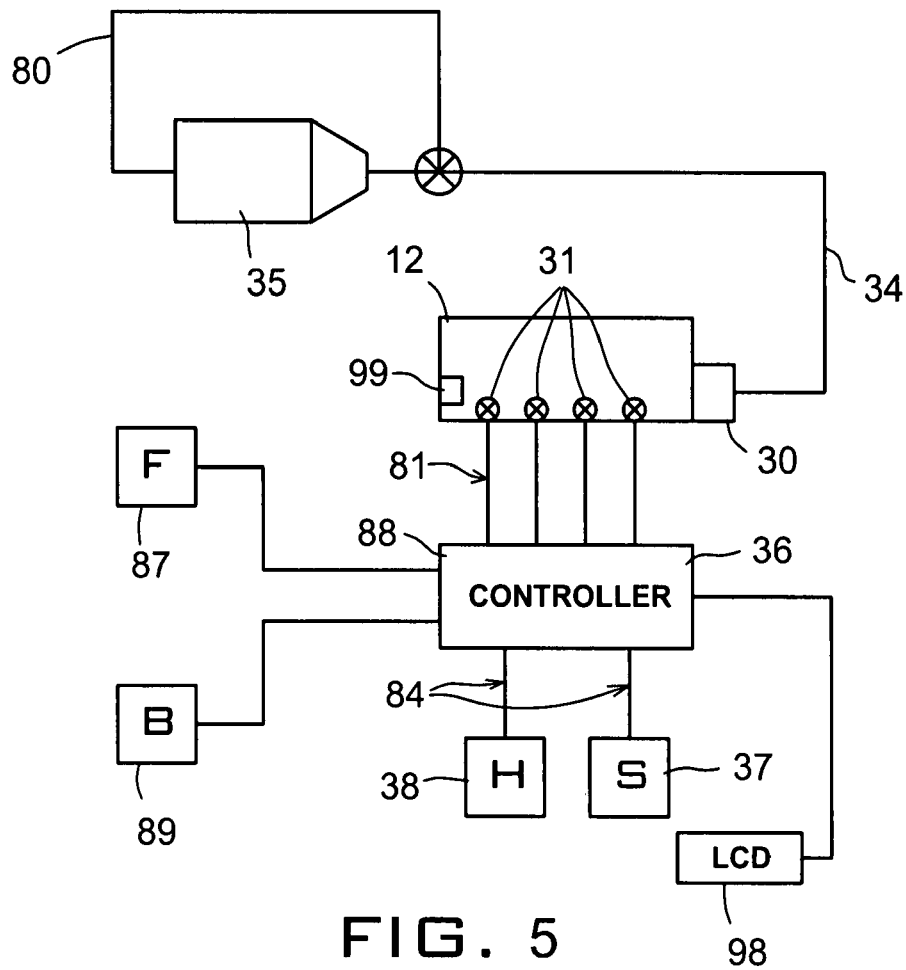
FIG. 5 is an electrical and pneumatic diagram showing connection between various elements of the invention.
FIG. 6 is a logical diagram showing the logic of the controller.

FIG. 5 shows a layout of the system diagram. Pressure builds at compressor 35, which is fed into line 34 that feeds back through feedback loop 80 so that the compressor can maintain a constant air pressure during operation of the vehicle. The compressor can turn on and maintain a constant air pressure only when the air inlet solenoids are activated, namely valve 31A and valve 31D. If the feedback loop 80 is entirely eliminated, the compressor can turn on only when the air inlet solenoids are activated.

The airline 34 runs from the compressor to the shock body 12. The shock body has a number of air valves 31 actuated by solenoids. Solenoid valve wires 81 are shown connected to controller 36 which is preferably implemented as an integrated circuit on printed circuit board. In any case, the physical implementation is not very relevant as long as logic 88 is on the controller 36. The logic is further described in FIG. 6. In FIG. 5, the controller 36 is also connected to a front switch 87 and a back switch 89 or alternatively to a height switch 38 and a stiffness switch 37. Controller wires 84 run from the controller 36 to the height switch 38 or the stiffness switch 37.

The height switch 38 or stiffness switch 37 can be implemented as a flip switch, a knob, a slide switch, or an LCD touch panel. Also, the forward switch 87 and back switch 89 can also be implemented as a variety of input devices that are known in the industry such as a flip switch, a knob, a slide switch, or an LCD touch panel. The variety of input devices can be analog, or digital. The best mode is to have a flip switch operate as the front switch, or back switch, or height switch, or stiffness switch. Here, the words front switch, or back switch, or height switch, or stiffness switch comprises any input device commonly known in the industry for controlling solenoid valves. Furthermore, these input devices may differ greatly in external appearance depending upon the style en vogue at the time. When making the actual device, it is important to note that the input devices including the front input, or back input, or stiffness input or stiffness input are properly styled so that they match the artistic style of the motorcycle. Motorcycles are essentially functional works of art, especially when they are custom-built. Therefore, great care needs to be attended to in selecting the look of the input devices for the front input, or back input, or stiffness input or stiffness input. A variety of input devices are commonly and commercially available and need not be discussed any further here.

Regarding the logic diagram of FIG. 6, the logic 88 is programmed on the controller 36. The physical manifestation of the logic 88 is well known to any electrical engineer and easy to implement because it can be made as a circuit of transistor switches. The chart shows height, stiffness, front, back as H, S, F, B respectively where the plus signs indicate addition or increase of that property and the minus signs indicate decrease or subtracting of that property. Here, the one designates activation of the solenoid and the zero in the chart designates non-activation of the solenoid.

Beginning with row one, when the height increase input is activated, solenoid 31A is activated, solenoid 31B is not activated, solenoid 31C is activated and solenoid 31D is not activated. On row two, when the height input decrease is activated, the opposite of row one occurs where solenoid 31A is not activated, solenoid 31B is activated, solenoid 31C is not activated and solenoid 31D is activated. For stiffness increase activation of the third row, only solenoids 31A and 31D are activated by the controller. Activation of the height increase, or height decrease or any of the other properties can be by a switch where the switch has a neutral position and can be pushed up to select increase of that property or pushed down to select decrease of that property. Here, the properties are height, stiffness, front air and back air.

When the height increase is activated, solenoids 31A and solenoid 31C is activated pushing air into the forward air chamber 22 and bleeding air from rear chamber 20. This makes the piston retract into the shock body 12 which moves the rear wheel frame 13 down in rotation on axis 9 to push the motorcycle and motorcycle seat 17 up. When the user desires the opposite in decreasing height, the opposite happens where solenoids 31A and solenoid 31C are not activated, but the others are so that forward air chamber 22 blows air to the atmosphere while rear chamber 20 receives more air. This would make the piston expand from the shock body 12 that would move the rear frame 13 top in rotation on axis 9 which would push the motorcycle and motorcycle seat 17 downward.

Regarding the front chamber property and back chamber denoted as F and B in FIG. 6, the front and back chamber can be controlled independently. For example on row five, if front chamber property is increased only solenoid 31A is activated which would add more air to the front chamber without affecting the rear chamber. If on row six the front chamber property is decreased, the solenoid 31B is activated bleeding air from the front chamber without affecting the rear chamber. Thus, the front chamber property can also be controlled independently of the other controls. The rear chamber, or back chamber B can be increased or decreased also in an independent manner without affecting the front chamber.

Having the height, stiffness, front, back controls would require preferably a total of four switches having four up positions indicating increase of the property and four neutral positions indicating no change of the property and four down positions indicating decrease of the property. It is possible to have only the front and back controls or the height and stiffness controls. The controller 36 can have the ability to output all of the front, back, height, stiffness controls and a user can connect only the ones that the user wants. This is important because a user may not want to have too many controls as this would complicate the riding experience. Also, the controls add clutter and visual effect that may be undesirable at times, or perhaps desirable at other times. In any case, a user can have only the height and stiffness controls to directly control height and stiffness. The user can also have only the front and back controls to control the height and stiffness. If the user only has the front and back controls the user can use them in combination so that the user can control height and stiffness. For example, if a user that only has front and back controls wants to increase height, the user may flip the front switch up and flip the back switch up so that both the front and back chambers are pressurized and this would pump air into the forward air chamber 22 while bleeding air from the rear chamber 20. The benefit of having the front and back controls is so that a user can independently pressurize the chambers. The benefit of having the height and stiffness controls is so that a user can control the height and stiffness. Because the user input controls can also be decorative, they can be chromed, or otherwise surface treated so that they match or contrast with the overall artistic theme of the motorcycle. The user input controls can also be hidden under a panel mounted in an inconspicuous location if necessary. The precise location for physical mounting depends upon the theme and style of the motorcycle.

Optionally, a number of air pressure sensors 99 mounted on the body of the shock 12 provides air pressure data to the controller. The controller can then use the air pressure data from the sensors 99 for providing a display to an LCD monitor 98 that displays the air pressure in the shock. Preferably, such air pressure sensors 99 would measure the air pressure of forward air chamber 22 and also the air pressure of back, or rear air chamber 20. The air pressure sensors can be used to gather data and provide digital visual output of the stiffness in metric or English units. The air pressure sensors 99 can also be used to gather data to linearize the otherwise nonlinear air pressure to height and stiffness correlations.

Furthermore, the air pressure sensors 99 can also be used to save preset positions such as memorized automatic seat positions in an automobile. For example, an off-road or rough road setting may have higher height and less stiffness while an on road setting could have lower height and higher stiffness. In any case, memorized preferences can be replicated by storing air pressure sensor data and then using the stored air pressure sensor data to return the shock to a saved position. The saved position would also save time in readjustment in case of maintenance or very slow leak over time. Because it is well known to an ordinary person of skill in the art to use saved position data to restore a mechanism to a saved position, it is not necessary to discuss the saved position technology further in this specification. For a general background regarding more recent saved seat position technology, please refer to U.S. Pat. No. 6,820,911 issued to Furui on Nov. 23, 2004 entitled vehicle rear seat position changing device, the entire disclosure of which is incorporated herein by reference.

Figure 7:
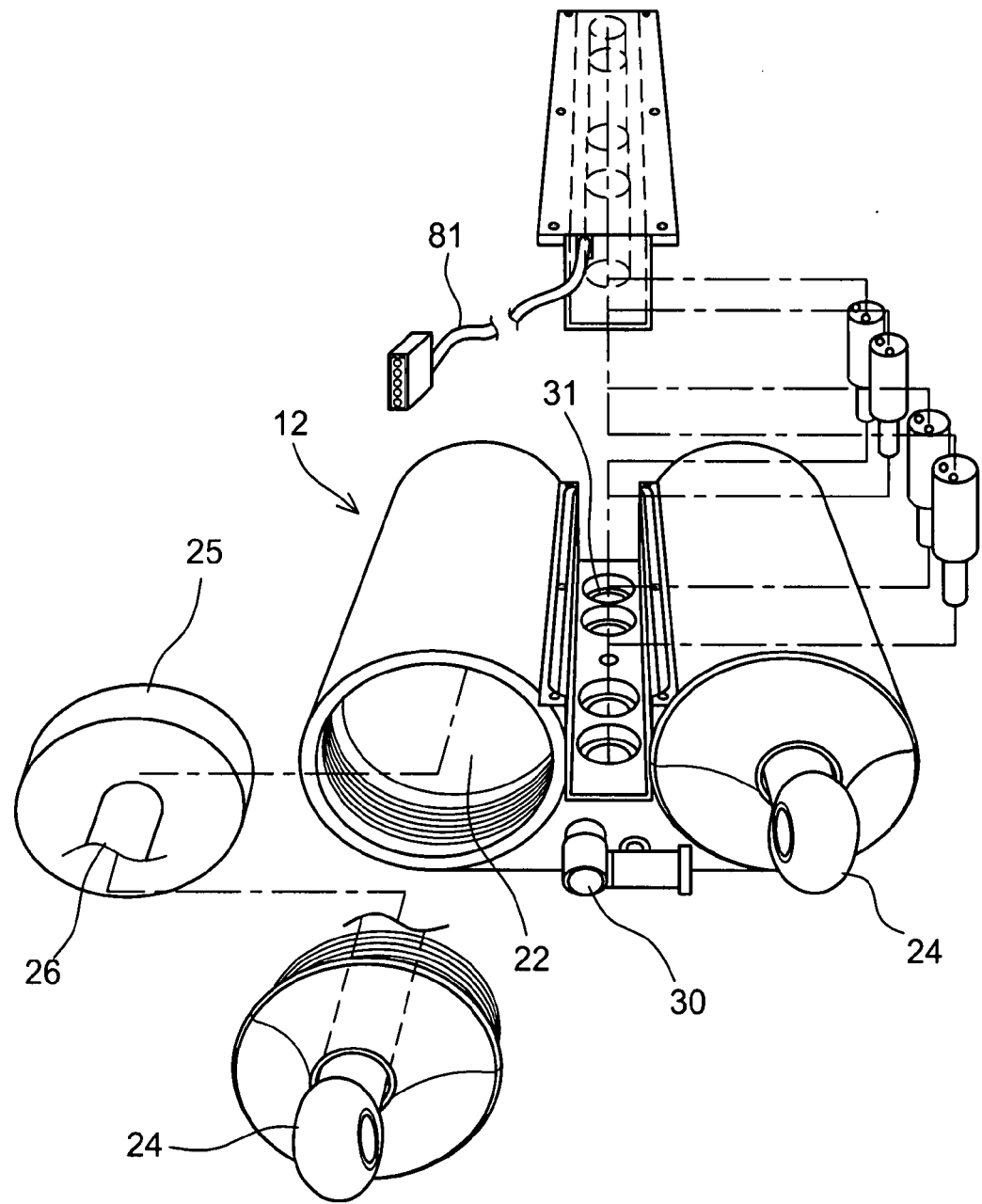
FIG. 7 is an exploded view.

FIG. 7 shows an exploded view that shows the device 12 with piston 25 placed inside the hollow cylindrical forward chamber 22 held by piston shaft 26 connecting to a piston shaft connector 24. A one way air valve 30 retains air in the system. A channel milled between the cylinders and pistons hold four solenoids that move a seal up and down to release and retain air flow. A wiring harness 81 leads from the channel cap and has a standardized plug for electrical connection.

Figure 8:
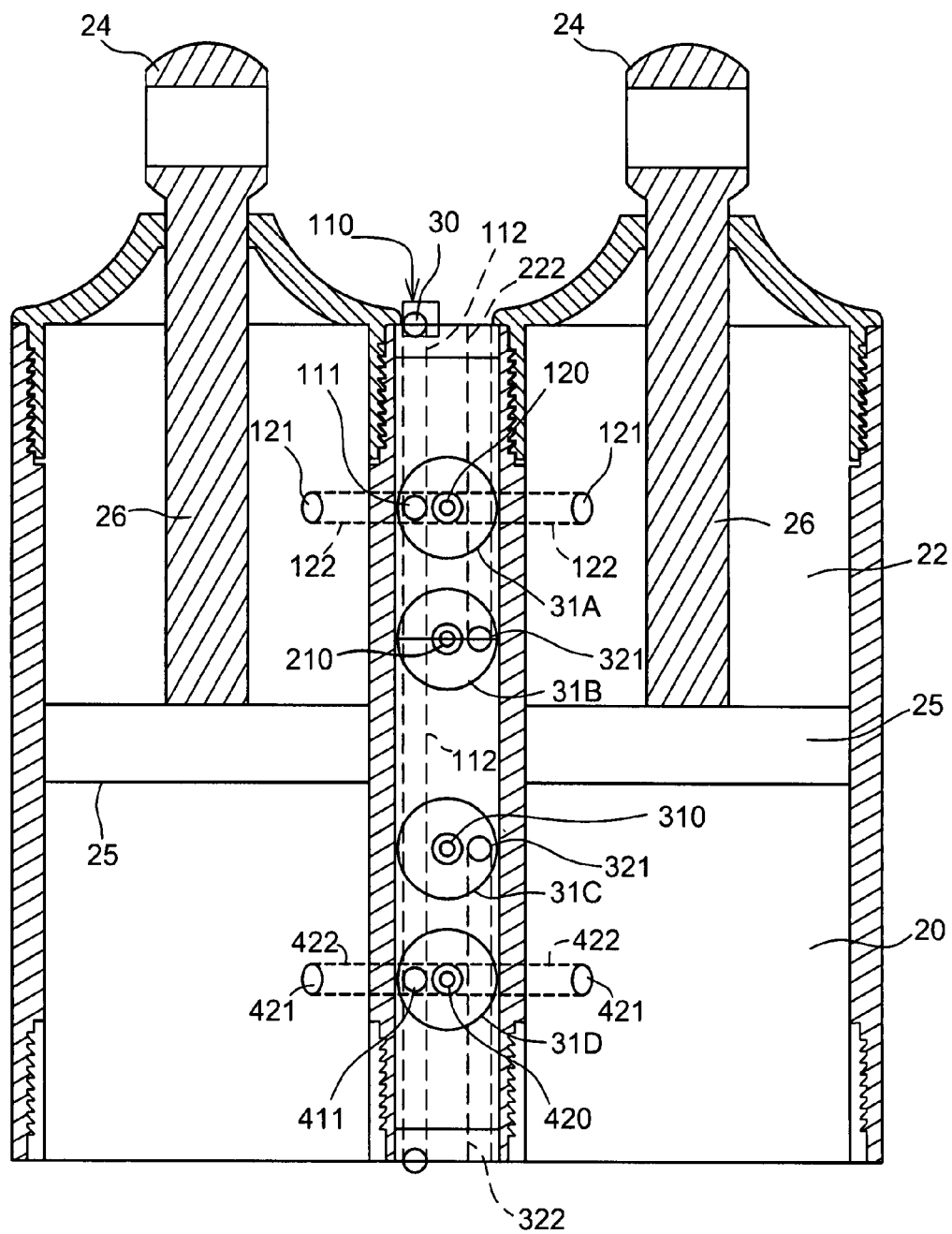
FIG. 8 is a diagram of the best mode of the present invention.

FIG. 8 shows the best mode of the present invention where the bleed passages 222, 322 are disposed from drilling at opposite ends of the material below the channel so that bleed passages 222, 322 communicate with the first inlet passage 122 and second inlet passage 422. The first bleed passage 222 and second bleed passage 322 are both capped after being drilled so that air does not leak out. Thus, in the best mode the air bleeds from the air inlet aperture 121 to the air inlet passage 122 through the bleed passage 222 past the valve 31B and out through air outlet port 210. The second lead passage works analogously to the first bleed passage. The best mode is the preferred means of construction because vertical drilled passages are preferred. For sake of clarity, in the best mode the air inlet 110 has communication with air inlet passage 121 at port 111 and also, with air inlet passage 422 at port 411. The bleed passage 222 has connection with the air inlet aperture 121 and the bleed passage 322 has connection with the air inlet aperture 421.

The invention claimed is:

1. A motorcycle shock system comprising:
   a. a shock body;
   b. an air compressor that provides pressurized air to the shock body when necessary;
   c. a piston held within the shock body defining a rear air chamber and a forward air chamber on the opposite side of the piston;
   d. four electrically controlled air valves including a first air valve that when actuated opens a passage to allow air to flow into the forward chamber, a second air valve that when actuated opens a passage to allow air to flow out of the forward chamber to the atmosphere, a third air valve that when actuated opens a passage to allow air to flow out of the rear air chamber, and a fourth air valve that when actuated opens a passage to allow air to flow into the rear air chamber;
   e. a body connector mounted to the shock body;
   f. a piston shaft mounted to the piston and sliding with the piston; and
   g. a piston shaft connector connecting to the piston shaft, wherein the body connector and the piston shaft connector are adapted to be connected to a motorcycle, wherein the air valves are controlled by an electronic controller having logic and receiving input from user input controls.

2. The motorcycle shock system of claim 1, further comprising a second piston held within the shock body defining a second rear air chamber and a second forward air chamber opposite the second piston; further comprising a second piston shaft mounted to the second piston and sliding with the second piston; and a second piston shaft connector connecting to the second piston shaft, wherein the body connector and the second piston shaft connector are adapted to be connected to a motorcycle.

3. The motorcycle shock system of claim 2, further comprising logic in the controller, wherein user input controls comprise at least a height increase input, a height decrease input, a stiffness increase input, and a stiffness decrease input, wherein the height increase input activates the first and third air valve, wherein the height decrease input activates the second and fourth air valve, wherein the stiffness increase input activates the first and fourth air valve, wherein the stiffness decrease input activates the second and third air valve.

4. The motorcycle shock system of claim 3, further comprising logic in the controller, wherein user input controls comprise at least a front chamber increase input, a front chamber decrease input, a back chamber increase input, and a back chamber decrease input, wherein the front chamber increase input activates only the first air valve, wherein the front chamber decrease input activates only the second air valve, wherein the back chamber increase input activates only the fourth air valve, wherein the back chamber decrease input activates only the third air valve.

5. The motorcycle shock system of claim 4, further comprising a channel formed between the pistons, wherein the first air valve, second air valve, third air valve, and fourth air valve are all mounted vertically within the channel, wherein air passages are formed by drilling in the shock body.

6. The motorcycle shock system of claim 1, further comprising logic in the controller, wherein user input controls comprise at least a height increase input, a height decrease input, a stiffness increase input, and a stiffness decrease input, wherein the height increase input activates the first and third air valve, wherein the height decrease input activates the second and fourth air valve, wherein the stiffness increase input activates the first and fourth air valve, wherein the stiffness decrease input activates the second and third air valve.

7. The motorcycle shock system of claim 6, further comprising logic in the controller, wherein user input controls comprise at least a front chamber increase input, a front chamber decrease input, a back chamber increase input, and a back chamber decrease input, wherein the front chamber increase input activates only the first air valve, wherein the front chamber decrease input activates only the second air valve, wherein the back chamber increase input activates only the fourth air valve, wherein the back chamber decrease input activates only the third air valve.

8. The motorcycle shock system of claim 7, further comprising a channel formed between the pistons, wherein the first air valve, second air valve, third air valve, and fourth air valve are all mounted vertically within the channel, wherein air passages are formed by drilling in the shock body.

9. The motorcycle shock system of claim 1, further comprising logic in the controller, wherein user input controls comprise at least a front chamber increase input, a front chamber decrease input, a back chamber increase input, and a back chamber decrease input, wherein the front chamber increase input activates only the first air valve, wherein the front chamber decrease input activates only the second air valve, wherein the back chamber increase input activates only the fourth air valve, wherein the back chamber decrease input activates only the third air valve.

10. The motorcycle shock system of claim 9, further comprising a channel formed between the pistons, wherein the first air valve, second air valve, third air valve, and fourth air valve are all mounted vertically within the channel, wherein air passages are formed by drilling in the shock body.

11. The motorcycle shock system of claim 1, further comprising a channel formed between the pistons, wherein the first air valve, second air valve, third air valve, and fourth air valve are all mounted vertically within the channel, wherein air passages are formed by drilling in the shock body.

12. The motorcycle shock system of claim 11, further comprising logic in the controller, wherein user input controls comprise at least a height increase input, a height decrease input, a stiffness increase input, and a stiffness decrease input, wherein the height increase input activates the first and third air valve, wherein the height decrease input activates the second and fourth air valve, wherein the stiffness increase input activates the first and fourth air valve, wherein the stiffness decrease input activates the second and third air valve.

13. The motorcycle shock system of claim 11, further comprising a second piston held within the shock body defining a second rear air chamber and a second forward air chamber opposite the second piston; further comprising a second piston shaft mounted to the second piston and sliding with the second piston; and a second piston shaft connector connecting to the second piston shaft, wherein the body connector and the second piston shaft connector are adapted to be connected to a motorcycle.

14. The motorcycle shock system of claim 1, further comprising logic in the controller, wherein user input controls comprise at least a front chamber increase input, a front chamber decrease input, a back chamber increase input, and a back chamber decrease input, wherein the front chamber increase input activates only the first air valve, wherein the front chamber decrease input activates only the second air valve, wherein the back chamber increase input activates only the fourth air valve, wherein the back chamber decrease input activates only the third air valve, further comprising a second piston held within the shock body defining a second rear air chamber and a second forward air chamber opposite the second piston; further comprising a second piston shaft mounted to the second piston and sliding with the second piston; and a second piston shaft connector connecting to the second piston shaft, wherein the body connector and the second piston shaft connector are adapted to be connected to a motorcycle.

15. A motorcycle shock system comprising:
 a. a shock body formed at least partially of aluminum;
 b. an air compressor that provides pressurized air to the shock body when necessary;
 c. a piston held within the shock body defining a rear air chamber and a forward air chamber on the opposite side of the piston;
 d. four electrically controlled air valves including a first air valve that when actuated opens a passage to allow air to flow into the forward chamber, a second air valve that when actuated opens a passage to allow air to flow out of the forward chamber to the atmosphere, a third air valve that when actuated opens a passage to allow air to flow out of the rear air chamber, and a fourth air valve that when actuated opens a passage to allow air to flow into the rear air chamber;
 e. a body connector mounted to the shock body;
 f. a piston shaft mounted to the piston and sliding with the piston; ad
 g. a piston shaft connector connecting to the piston shaft, wherein the body connector and the piston shaft connector are adapted to be connected to a motorcycle, wherein the air valves are controlled by an electronic controller having logic and receiving input from user input controls;
 h. a second piston held within the shock body defining a second rear air chamber and a second forward air chamber opposite the second piston; further comprising a second piston shaft mounted to the second piston and sliding with the second piston; and a second piston shaft connector connecting to the second piston shaft, wherein the body connector and the second piston shaft connector are adapted to be connected to a motorcycle; and
 i. a one-way air valve holding air inside the shock body and receiving air into the shock body.

16. The motorcycle shock system of claim 15, further comprising logic in the controller, wherein user input controls comprise at least a height increase input, a height decrease input, a stiffness increase input, and a stiffness decrease input, wherein the height increase input activates the first and third air valve, wherein the height decrease input activates the second and fourth air valve, wherein the stiffness increase input activates the first and fourth air valve, wherein the stiffness decrease input activates the second and third air valve.

17. The motorcycle shock system of claim 15, further comprising logic in the controller, wherein user input controls comprise at least a front chamber increase input, a front chamber decrease input, a back chamber increase input, and a back chamber decrease input, wherein the front chamber increase input activates only the first air valve, wherein the front chamber decrease input activates only the second air valve, wherein the back chamber increase input activates only the fourth air valve, wherein the back chamber decrease input activates only the third air valve.

18. The motorcycle shock system of claim 17, further comprising a channel formed between the pistons, wherein the first air valve, second air valve, third air valve, and fourth air valve are all mounted vertically within the channel, wherein air passages are formed by drilling in the shock body.

19. The motorcycle shock system of claim 17, further comprising logic in the controller, wherein user input controls comprise at least a height increase input, a height decrease input, a stiffness increase input, and a stiffness decrease input, wherein the height increase input activates the first and third air valve, wherein the height decrease input activates the second and fourth air valve, wherein the stiffness increase input activates the first and fourth air valve, wherein the stiffness decrease input activates the second and third air valve.

20. The motorcycle shock system of claim 19, further comprising a channel formed between the pistons, wherein the first air valve, second air valve, third air valve, and fourth air valve are all mounted vertically within the channel, wherein air passages are formed by drilling in the shock body.

* * * * *